United States Patent [19]

Ishigaki et al.

[11] Patent Number: 4,698,693

[45] Date of Patent: Oct. 6, 1987

[54] AUDIO MAGNETIC RECORDING AND/OR REPRODUCING APPARATUS UTILIZING FREQUENCY MODULATION

[75] Inventors: Yukinobu Ishigaki, Machida; Yasuomi Namiki, Yokohama; Hisashige Fujiwara, Yokohama; Kazutoshi Hirohashi, Yokohama, all of Japan

[73] Assignee: Victor Company of Japan, Ltd., Yokohama, Japan

[21] Appl. No.: 727,757

[22] Filed: Apr. 26, 1985

[30] Foreign Application Priority Data

Apr. 28, 1984 [JP] Japan .................................. 59-87320
May 14, 1984 [JP] Japan .................................. 59-96267

[51] Int. Cl.$^4$ .......................................... H04N 5/782
[52] U.S. Cl. .................................. 358/310; 358/343; 360/19.1
[58] Field of Search ...................... 358/310, 341, 343; 360/19.1

[56] References Cited

U.S. PATENT DOCUMENTS 4,490,753 12/1984 Ito et al. ............................. 360/19.1

Primary Examiner—Robert L. Richardson

Attorney, Agent, or Firm—Michael N. Meller

[57] ABSTRACT

A rotary head type magnetic recording and reproducing apparatus comprises a circuit for recording and reproducing a signal on and from a magnetic recording medium by rotary heads, a circuit for obtaining a frequency modulated (FM) audio signal by frequency-modulating a carrier by an audio signal which is to be recorded, a circuit for generating a frequency drift detection signal having a constant frequency which does not exist within a frequency range occupied by the FM audio signal, a circuit for obtaining a frequency multiplexed signal by frequency-multiplexing the FM audio signal and the detection signal, a circuit for separating the FM audio signal and the detection signal from the signal reproduced by the rotary heads, a demodulating circuit for obtaining an audio signal by frequency-demodulating the separated FM audio signal, a detecting circuit for frequency-demodulating the separated detection signal and for detecting a frequency drift component, a circuit for forming a frequency drift correction signal responsive to the output of the detecting circuit, and a circuit for correcting a frequency drift component in the output audio signal of the demodulating circuit by the correction signal.

16 Claims, 6 Drawing Figures

AUDIO MAGNETIC RECORDING AND/OR REPRODUCING APPARATUS UTILIZING FREQUENCY MODULATION

BACKGROUND OF THE INVENTION

The present invention generally relates to rotary head type magnetic recording and/or reproducing apparatuses, and more particularly to a rotary head type magnetic recording and/or reproducing apparatus designed to carry out recording and/or reproduction without being affected by the eccentricity in the rotation of a rotary magnetic head or heads when recording and/or reproducing an audio signal on and/or from a magnetic recording medium by use of the rotary magnetic head or heads.

Conventionally, as a most popularly employed magnetic recording and reproducing system for magnetically recording and reproducing an audio signal, there is a system which carries out recording and reproduction of the audio signal on and from a moving magnetic tape by use of a stationary magnetic head. The recording and reproduction of the audio signal is carried out by use of the A.C. bias system, for example, and the audio signal is directly recorded on the magnetic tape as it is, without being subjected to a signal processing such as modulation. In the present specification, such a method of directly recording the signal on the recording medium without subjecting the signal to a signal processing such as modulation, will be referred to as a direct recording method.

When recording the signal which is to be recorded and reproduced on the magnetic tape according to the direct recording method, it is known that problems occur due to causes such as a change in the state of contact between the magnetic tape and the magnetic head and irregularities in a magnetic layer of the magnetic tape. Such problems include fluctuations in the amplitude of the signal which is recorded and reproduced, and the difficult compensation (equalization) of the characteristic when recording and reproducing a signal having a wide frequency band.

It is also known that the problems introduced when recording the audio signal on the magnetic tape according to the direct recording method, can be eliminated satisfactorily by subjecting the audio signal which is to be recorded and reproduced to an angular modulation and recording an angular modulated signal (for example, a frequency modulated signal) on the magnetic tape. However, when recording and reproducing the audio signal in the form of the angular modulated signal, the frequency band of the signal which is recorded becomes wide compared to that of the signal which is recorded according to the direct recording method. Thus, when recording the angular modulated signal on the magnetic tape, a large relative speed is required between the magnetic tape and the magnetic head, and there is a problem in that a large quantity (length) of magnetic tape will be used per unit time. For this reason, the method of subjecting the signal to be recorded to such a modulation, is conventionally not employed in the magnetic recording and reproducing apparatus which uses the stationary magnetic head.

In a magnetic recording and reproducing apparatus which records and reproduces a television video signal which occupies a wide frequency band, rotary magnetic heads are conventionally used as the magnetic heads. In such a magnetic recording and reproducing apparatus, the relative speed between the magnetic tape and the magnetic head is set to a predetermined large speed so as to enable the recording of an angular modulated signal which is obtained by subjecting the television video signal to an angular modulation. According to such a magnetic recording and reproducing apparatus, the recording and reproduction can be carried out for a long period of time without requiring an excessively large quantity of magnetic tape. Such a magnetic recording and reproducing apparatus is widely reduced to practice, and a magnetic recording and reproducing apparatus (video tape recorder or simply called VTR) for home use using one or more rotary magnetic heads is popular all over the world. According to the VTR for home use, the moving speed of the magnetic tape is set to an extremely slow speed of a several centimeters per second, and the recording and reproduction are carried out by the rotary magnetic head which performs a helical scan. As a result, it is possible to carry out the recording for several hours, for example, by use of a small quantity of magnetic tape.

However, in the VTR for home use, the recording and reproduction of the audio signal are generally carried out by a stationary magnetic head which records and reproduces the audio signal on and from an audio track which extends in the longitudinal direction of the magnetic tape along one edge of the magnetic tape. For this reason, there is a problem in that it is impossible to obtain reproduced sound of a high quality.

In order to eliminate the problem introduced in the VTR for home use, a VTR in which an angular modulated signal obtained by subjecting the audio signal to an angular modulation is recorded and reproduced on and from the magnetic tape by a pair of rotary magnetic heads having an extremely large relative speed between the magnetic tape and the magnetic head, has been reduced to practice.

The above VTR can easily record and reproduce on and from the magnetic tape an audio signal having a wide frequency band. Hence, there are cases where the VTR is used solely for the recording and reproduction of the audio signal.

No problems will occur when the reproduction of the angular modulated signal from the magnetic tape is carried out on the same VTR which recorded the angular modulated signal on the magnetic tape. However, when the reproduction of the angular modulated signal from the magnetic tape is carried out on a VTR which is different from the VTR which actually recorded the angular modulated signal on the magnetic tape, noise having a period related to the rotation period of a rotary drum which is mounted with the rotary magnetic heads mixes into the reproduced signal. As a result, the quality of the reproduced sound is greatly deteriorated, and it is difficult to carry out the recording and reproduction of the audio signal with a high fidelity.

The problems of the above VTR have been studied. In other words, in a case where a rotary locus of the tip end part of each rotary magnetic head is not a perfect circle, a frequency drift (or fluctuation) is introduced in the reproduced signal through the recording and reproducing operations. When it is assumed that the rotary drum mounted with the rotary magnetic heads rotates with an eccentricity value $\Delta x$, a rate $\Delta v$ of the drift in the relative speed between one magnetic head and the magnetic tape can be described in terms of a radius r of the rotary drum and the eccentricity value $\Delta x$ of the rotary drum as may be seen from the following equation (1).

$$\Delta v = (r - \Delta x)/r \quad (1)$$

When it is assumed that a frequency deviation $\Delta f$ occurs with respect to a frequency fo of the signal which is to be recorded, due to the drift in the relative speed between the rotary magnetic head mounted on the rotary drum and the magnetic tape which drift is caused by the eccentricity of the rotary drum, the frequency deviation f can be described by the following equation (2).

$$\Delta f = (fo/\Delta v) - fo \quad (2)$$

The two rotary magnetic heads mounted on the rotary drum are alternately used so as to successively scan over the tracks on the magnetic tape. Thus, the actual frequency deviation is $2\Delta f$.

When it is assumed that the radius r of the rotary drum is equal to 31 mm and the eccentricity value $\Delta x$ is equal to 5 $\mu$m, for example, the rate $\Delta v$ becomes equal to 0.9998387. When it is assumed that the frequency fo of the signal to be recorded is equal to 1.7 MHz, the frequency deviation $\Delta f$ becomes equal to 274 Hz, and the signal to be recorded is constantly subjected to the frequency deviation $2\Delta f = 548$ Hz$_{p-p}$. In a case where the reference frequency deviation of the frequency modulated audio signal is equal to $\pm 50$ kHz, the frequency deviation $2\Delta f = 548$ Hz$_{p-p}$ has a level of $-39.2$ dB with respect to the level of the reference frequency deviation.

In other words, when there is an eccentricity of 5 $\mu$m in the rotation of the rotary drum in the example given before, an unwanted signal (a fundamental wave having a frequency corresponding to the rotational speed of the rotary drum and harmonics thereof) having the level of $-39.2$ dB with respect to the reproduced signal level when the the frequency modulated audio signal has the reference frequency deviation, is always mixed into the reproduced signal.

The frequency drift described before scarcely introduces problems when the recorded signal is reproduced from the magnetic tape on the same magnetic recording and reproducing apparatus which actually recorded the signal on the magnetic tape. No problems are introduced in this case because the frequency drift at the time of the recording is mutually cancelled with the frequency drift at the time of the reproduction. However, in a case where the recorded signal is reproduced from the magnetic tape on a magnetic recording and reproducing apparatus which is different from the magnetic recording and reproducing apparatus which actually recorded the signal on the magnetic tape, a serious problem occurs since the frequency drift at the time of the reproduction is added to the frequency drift at the time of the recording and the frequency drift is substantially doubled.

SUMMARY OF THE INVENTION

Accordingly, it is a general object of the present invention to provide a novel and useful rotary head type magnetic recording and/or reproducing apparatus, in which the problems described heretofore are eliminated.

Another and more specific object of the present invention is to provide a rotary head type magnetic recording and/or reproducing apparatus which records by rotary magnetic heads a signal at least including an angular modulated audio signal. At the time of the recording, the apparatus according to the present invention records on a magnetic recording medium a detection signal having a constant frequency together with the angular modulated audio signal by use of the rotary magnetic heads. At the time of the reproduction, the recorded signal is reproduced from the magnetic recording medium by use of the rotary magnetic heads, and the detection signal within the reproduced signal is subjected to an angular demodulation so as to obtain a demodulated signal. A correction signal for correcting the frequency deviation is obtained based on the demodulated signal. The correction signal is subtracted from a signal which is obtained by subjecting to an angular demodulation the angular modulated audio signal within the reproduced signal.

Still another object of the present invention is to provide a rotary head type magnetic recording and/or reproducing apparatus which is designed so as not to obtain an unwanted false correction signal from a noise component when reproducing the angular modulated audio signal from a magnetic recording medium which is not recorded with the detection signal at the time of the recording.

Other objects and further features of the present invention will be apparent from the following detailed description when read in conjunction with the accompanying drawings.

DETAILED DESCRIPTION

Figure 1:
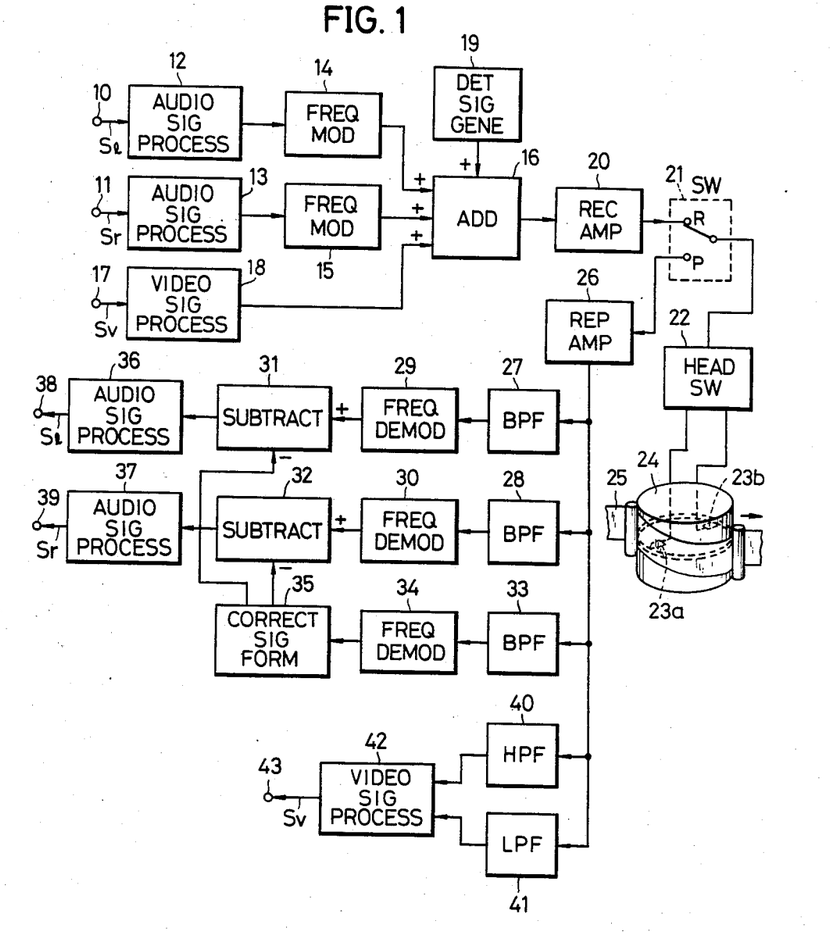
FIG. 1 is a system block diagram showing a first embodiment of a rotary head type magnetic recording and reproducing apparatus according to the present invention.

First, a description will be given with respect to the block system of a first embodiment of the rotary head type magnetic recording and reproducing apparatus according to the present invention, by referring to FIG. 1. Left and right channel audio signals S1 and Sr applied to respective input terminals 10 and 11, are subjected to a predetermined signal processing in respective audio signal processing circuits 12 and 13. Each of the audio signal processing circuits 12 and 13 is constituted by a noise reduction circuit, a pre-emphasis circuit and the like. An output signal of the audio signal processing circuit 12 is supplied to a frequency modulator 14 wherein the signal frequency-modulates a carrier having a frequency f1. An output frequency modulated audio signal FM1 of the frequency modulator 14 is supplied to an adding circuit 16. Similarly, an output signal of the audio signal processing circuit 13 is supplied to a frequency modulator 15 wherein the signal frequency-modulates a carrier having a frequency f2. An output frequency modulated audio signal FMr of the frequency modulator 15 is also supplied to the adding circuit 16. The frequencies f1 and f2 of the carriers and the frequency bands of the frequency modulated audio signals FM1 and FMr are selected so as not to overlap with each other, as may be seen in the frequency spectrums shown in FIG. 2.

Figure 2:
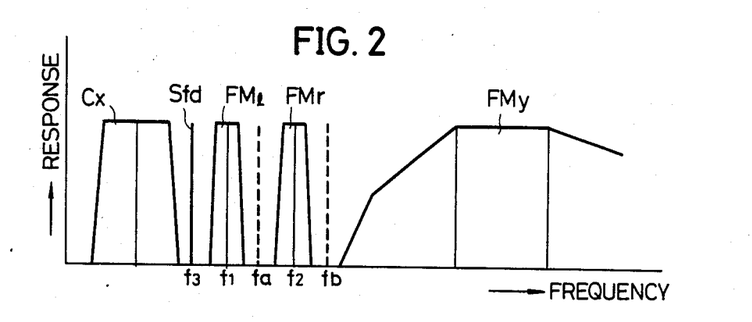
FIG. 2 shows frequency spectrums of signals which are recorded and reproduced in the apparatus shown in FIG. 1.

For example, an NTSC system color video signal Sv having such a signal format that a carrier chrominance signal is band-share-multiplexed to a luminance signal within the frequency band of the luminance signal, is applied to an input terminal 17. The color video signal Sv is supplied to a video signal processing circuit 18 wherein the carrier chrominance signal and the luminance signal are separated. In the video signal processing circuit 18, the separated luminance signal frequencymodulates a carrier and is formed into a frequency modulated luminance signal FMy, and the separated carrier chrominance signal is frequency-converted into a low frequency band and is formed into a frequency converted carrier chrominance signal Cx. The frequency modulated luminance signal FMy and the frequency converted carrier chrominance signal Cx occupy frequency bands shown in FIG. 2. As shown in FIG. 2, the frequency modulated audio signals FM1 and FMr exist between the frequency bands of the frequency modulated luminance signal FMy and the frequency converted carrier chrominance signal Cx. The output signals FMy and Cx of the video signal processing circuit 18 are supplied to the adding circuit 16 and are added and frequency-multiplexed with the frequency modulated audio signals FM1 and FMr from the frequency modulators 14 and 15.

On the other hand, a detection signal generating circuit 19 generates a frequency drift detection signal Sfd having a constant frequency f3 and supplies this detection signal Sfd to the adding circuit 16. The detection signal Sfd is frequency-multiplexed with each of the signals in the adding circuit 16. For example, the frequency f3 of the detection signal Sfd is selected to a frequency existing between the frequencies of the signals FM1 and Cx.

An output frequency multiplexed signal of the adding circuit 16, having the frequency spectrum shown in FIG. 2, is passed through a switch 21 which is connected to a terminal R in the recording mode of the apparatus and a head switching circuit 22, and is supplied to rotary magnetic heads 23a and 23b. The rotary heads 23a and 23b are provided diametrically on a rotary drum 24 and rotate together with the rotary drum 24. A magnetic tape 25 is wrapped obliquely around the outer peripheral surface of the rotary drum 24 over an angular range which is slightly greater than 180°, and the rotary heads 23a and 23b alternately record the signal supplied thereto on oblique tracks on the moving magnetic tape 25.

In the reproducing mode of the apparatus, the switch 21 is connected to a terminal P. The signal recorded on the magnetic tape 25 is alternately reproduced by the rotary heads 23a and 23b. The reproduced signals which are alternately and successively obtained from the rotary heads 23a and 23b, are passed through the head switching circuit 22 which has the known circuit construction, and are formed into a continuous signal.

The reproduced signal from the head switching circuit 22 is passed through the switch 21 and is supplied to a reproducing amplifier 26. An output signal of the reproducing amplifier 26 is supplied to bandpass filters 27, 28, and 33, a highpass filter 40, and a lowpass filter 41.

The bandpass filter 27 obtains the frequency modulated audio signal FM1 having the center frequency f1 from the reproduced signal supplied thereto, and supplies the frequency modulated audio signal FM1 to a frequency demodulator 29 wherein the frequency modulated audio signal FM1 is frequency-demodulated. An output signal of the frequency demodulator 29 is supplied to a subtracting circuit 31. On the other hand, the bandpass filter 28 obtains the frequency modulated audio signal FMr having the center frequency f2 from the reproduced signal supplied thereto, and supplies the frequency modulated audio signal FMr to a frequency demodulator 30 wherein the frequency modulated audio signal FMr is frequency-demodulated. An output signal of the frequency demodulator 30 is supplied to a subtracting circuit 32.

The bandpass filter 33 obtains the detection signal Sfd having the frequency f3 from the reproduced signal supplied thereto, and supplies the detection signal Sfd to a frequency demodulator 34 wherein the detection signal Sfd is frequency-demodulated. In a case where the eccentricity exists in the rotational center of the rotary drum 24 and the frequency drift which is caused by the eccentricity and is introduced in the signal which is recorded and reproduced is not cancelled by the recording and reproduction, an output signal of the frequency demodulator 34 is in correspondence with the above frequency drift.

The output signal of the frequency demodulator 34 is supplied to a frequency drift correction signal forming circuit 35 wherein the signal is subjected to a signal processing including elimination of the signal component having the frequency f3, matching of the timing, amplification, and level adjustment. An output signal of the correction signal forming circuit 35 is supplied to the subtracting circuits 31 and 32 as a frequency drift correction signal. The subtracting circuits 31 and 32 eliminate the frequency drift component included in the demodulated left and right channel audio signals from the respective frequency demodulators 29 and 30, by subtracting the output correction signal of the correction signal forming circuit 35 from the respective demodulated left and right channel audio signals.

Output audio signals of the subtracting circuits 31 and 32 are supplied to respective audio signal processing circuits 36 and 37 and are each subjected to a predetermined signal processing. Each of the audio signal processing circuits 36 and 37 include a noise reduction circuit which comprises a decoder, a de-emphasis circuit and the like. Reproduced left and right channel audio signals Sl and Sr having no frequency drift are obtained through respective output terminals 38 and 39.

The highpass filter 40 obtains the frequency modulated luminance signal FMy from the reproduced signal supplied thereto, and the lowpass filter 41 obtains the frequency converted carrier chrominance signal Cx from the reproduced signal supplied thereto. The frequency modulated luminance signal FMy from the highpass filter 40 and the frequency converted carrier chrominance signal from the lowpass filter 41 are supplied to a video signal processing circuit 42. The video signal processing circuit 42 frequency-demodulates the frequency modulated luminance signal FMy into the original luminance signal, and frequency-converts the frequency converted carrier chrominance signal Cx into the original carrier chrominance signal which is returned to the original frequency band. Further, the video signal processing circuit 42 mixes the luminance signal and the carrier chrominance signal so as to obtain the original color video signal Sv, and the color video signal is obtained through an output terminal 43.

Figure 3:
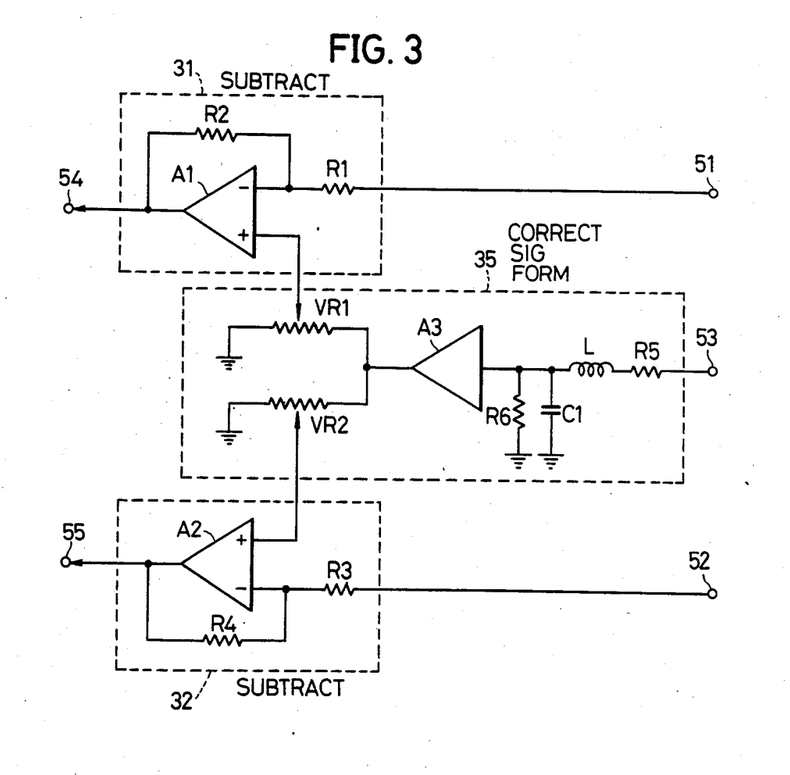
FIG. 3 is a concrete circuit diagram showing a part of the block system shown in FIG. 1.

Concrete circuit examples of the frequency drift correction signal forming circuit 35 and the subtracting circuits 31 and 32 are shown in FIG. 3. The output signals of the frequency demodulators 29 and 30 are applied to respective terminals 51 and 52. The output signal of the frequency demodulator 34 is applied to a terminal 53. An inverting input terminal of an operational amplifier A1 within the subtracting circuit 31, is coupled to the terminal 51 through a resistor R1. A resistor R2 is coupled between an output terminal and a non-inverting input terminal of the operational amplifier A1. An inverting input terminal of an operational amplifier A2 within the subtracting circuit 32, is coupled to the terminal 52 through a resistor R3. A resistor R4 is coupled between an output terminal and a non-inverting input terminal of the operational amplifier A2.

The frequency drift correction signal forming circuit 35 comprises resistors R5 and R6, a coil L, a capacitor C1, a buffer amplifier A3, and variable resistors VR1 and VR2 coupled as shown in FIG. 3. The variable resistors VR1 and VR2 are coupled in parallel, and a slider of the variable resistor VR1 is coupled to the non-inverting input terminal of the operational amplifier A1 within the subtracting circuit 31. A slider of the variable resistor VR2 is coupled to the non-inverting input terminal of the operational amplifier A2 within the subtracting circuit 32. The resistors R5 and R6, the coil L, and the capacitor C1 constitute a circuit which has the function of a delay circuit for matching the timing and also the function of a filter circuit for eliminating the signal component having the frequency f3.

The carrier frequencies of the frequency modulated left channel audio signal FM1 and the frequency modulated right channel audio signal FMr are different. Generally, the higher the carrier frequency is, the larger the modulated and demodulated voltages are. For this reason, the voltage of the frequency drift correction signal with respect to the right channel audio signal having the higher carrier frequency, that is, the correction signal supplied to the subtracting circuit 32, must be higher than the voltage of the frequency drift correction signal with respect to the left channel audio signal having the lower carrier frequency, that is, the correction signal supplied to the subtracting circuit 31. Accordingly, the correction signals supplied to the subtracting circuits 31 and 32 are adjusted by the variable resistors VR1 and VR2 so that the voltage of the correction signal supplied to the subtracting circuit 32 is higher than the voltage of the correction signal supplied to the subtracting circuit 31. As a result, the left and right channel audio signals in which the frequency drift component has been similarly corrected, are obtained through the output terminal 54 and 55 and are supplied to the respective audio signal processing circuits 36 and 37.

In the embodiment described heretofore, the frequency of the detection signal Sfd is selected to the frequency f3 which is between the frequencies of the frequency converted carrier chrominance signal Cx and the frequency modulated audio signal FM1. However, the frequency of the detection signal Sfd is not limited to the frequency f3. For example, the frequency of the detection signal Sfd may be selected to a frequency fa between the frequencies of the frequency modulated audio signal FM1 and the frequency modulated audio signal FMr, or to a frequency fb between the frequencies of the frequency modulated audio signal FMr and the frequency modulated luminance signal FMy. In other words, the frequency of the detection signal Sfd simply needs to exist between the frequency bands occupied by the signals Cx, FM1, FMr, and FMy.

In a case where the frequency of the detection signal Sfd is selected to the frequency fa, the detection signal Sfd(a) in this case can be described by the following equations (3) and (4).

$$(Sfd(a) - FM1) + Sfd(a) = FMr \qquad (3)$$

$$(Sfd(a) - FMr) + Sfd(a) = FM1 \qquad (4)$$

However, the magnetic recording and reproducing transmission system generally has a non-linear characteristic, and the problem of interference of frequencies occurs. For this reason, it is more desirable to select the frequency of the detection signal Sfd to the frequency f3 or fb rather than to the frequency fa. In any case, the frequency of the detection signal Sfd must be selected so that frequencies which are the sum and the difference of the detection signal Sfd and the frequency modulated audio signal FMr do not exist within the frequency modulated audio signal FM1, and frequencies which are the sum and the difference of the detection signal Sfd and the frequency modulated audio signal FM1 do not exist within the frequency modulated audio signal FMr. When the frequency of the detection signal Sfd is high (that is, when the frequency of the detection signal Sfd is selected to the frequency fb), it is necessary to amplify the recording level in advance by taking into account the demagnetization effect and the like. But when such a measure is taken, a cross modulation easily occurs due to the effects of the non-linear characteristic of the recording transmission system and the like. On the other hand, when the frequency of the detection signal Sfd is low (that is, when the frequency of the detection signal Sfd is selected to the frequency f3), the level of the frequency drift correction signal which is obtained by frequency-demodulating the detection signal Sfd becomes somewhat smaller. In this case, the signal-to-noise (S/N) ratio becomes somewhat deteriorated by the subtracting processes performed in the subtracting circuits 31 and 32. By taking all of the above into consideration, it is the present inventors' integrated judgement that the frequency of the detection signal Sfd should desirably be selected to the frequency f3, and the above embodiment is described based on this judgement. As a numerical example, the carrier frequencies f1 and f2 of the frequency modulated audio signals FM1 and FMr are selected to 1.3 MHz and 1.7 MHz, respectively, and the frequency f3 of the detection signal Sfd is selected to 1.05 MHz.

Figure 4:
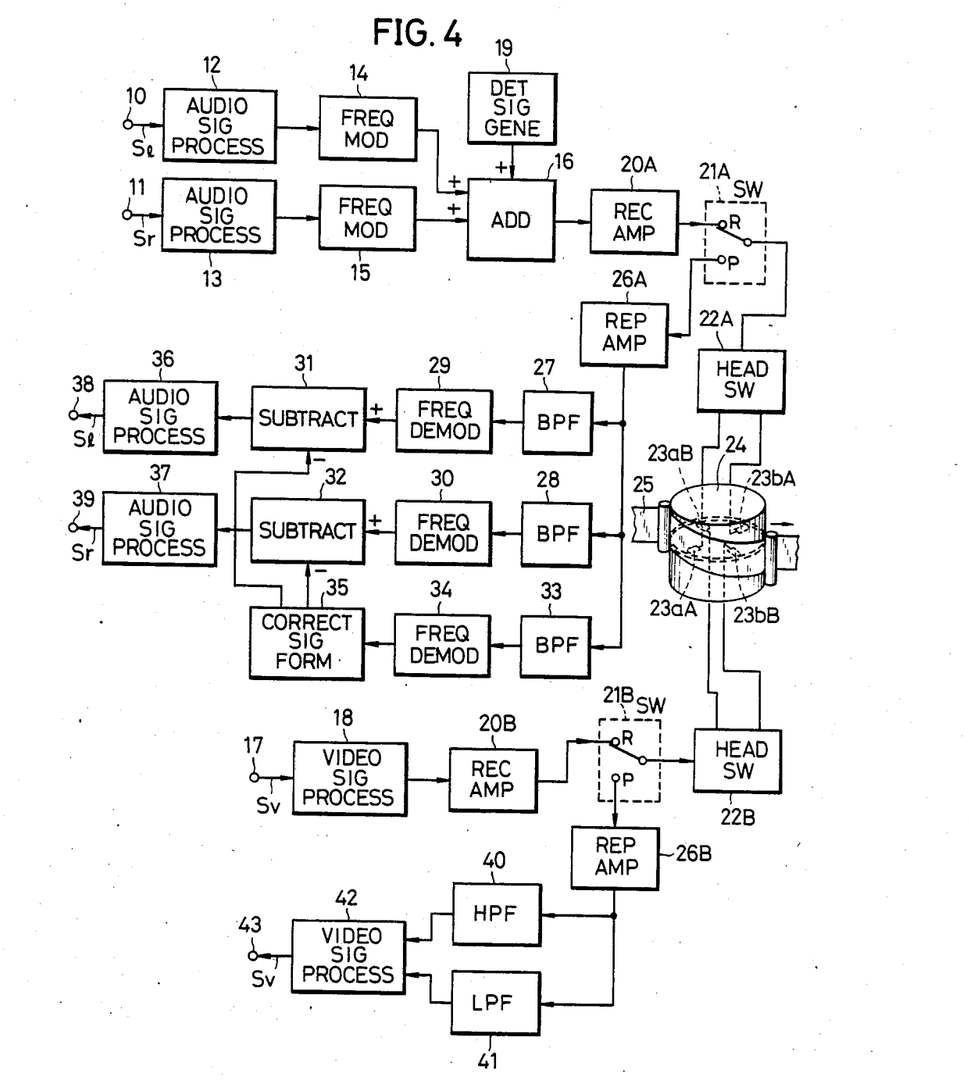
FIG. 4 is a system block diagram showing a modification of the first embodiment of the rotary head type magnetic recording and reproducing apparatus according to the present invention.

Next, a description will be given with respect to a modification of the first embodiment of the rotary head type magnetic recording and reproducing apparatus according to the present invention, by referring to FIG. 4. In FIG. 4, those parts which are the same as those corresponding parts in FIG. 1 will be designated by the same reference numerals, and their description will be omitted.

The output frequency modulated audio signals FM1 and FMr of the frequency modulators 14 and 15 and the output detection signal Sfd of the detection signal generating circuit 19 are supplied to the adding circuit 16 wherein the three signals are added and frequency-multiplexed. The output signal of the adding circuit 16 is passed through a recording amplifier 20A, a switch 21A, and a head switching circuit 22A, and is then supplied to audio rotary heads 23aA and 23bA. The audio rotary heads 23aA and 23bA record the output signal of the adding circuit 16 on tracks formed obliquely to the longitudinal direction of the magnetic tape 25, at a deep (inner) layer part in the thickness direction of the magnetic tape 25.

On the other hand, the output signal of the video signal processing circuit 18 is passed through a recording amplifier 20B, a switch 21B, and a head switching circuit 22B, and is then supplied to video rotary heads 23aB and 23bB. The video rotary heads 23aB and 23bB record the output signal of the video signal processing circuit 18 on tracks formed obliquely to the longitudinal direction of the magnetic tape 25, at a surface (outer) layer part in the thickness direction of the magnetic tape 25. The method of recording the audio signal at the deep layer part of the magnetic tape by use of a pair of rotary heads and recording the video signal at the surface layer part of the magnetic tape by use of another pair of rotary heads, is known.

In the reproducing mode, the signal reproduced by the rotary heads 23aA and 23bA is passed through the head switching circuit 22A, the switch 21A, and a reproducing amplifier 26A, and is then supplied to the bandpass filters 27, 28, and 33. The signal reproduced by the rotary heads 23aB and 23bB is passed through the head switching circuit 22B, the switch 21B and a reproducing amplifier 26B, and is then supplied to the highpass filter 40 and the lowpass filter 41. The operations of the remaining circuit part of the block system shown in FIG. 4 are the same as those of the block system shown in FIG. 1, and description thereof will be omitted.

In the embodiment and the modification described heretofore, the recording of the signal on the magnetic tape and the reproduction of the signal from the magnetic tape are carried out on the same magnetic recording and reproducing apparatus, for convenience' sake. However, there are generally more cases where the recording of the signal on the magnetic tape and the reproduction of the signal from the magnetic tape are carried out on different magnetic recording and reproducing apparatuses. Therefore, according to the apparatus of the present invention, it is possible to effectively correct and eliminate the undesirable effects of the frequency drift which is caused by the eccentricity of the rotary drum.

Figure 5:
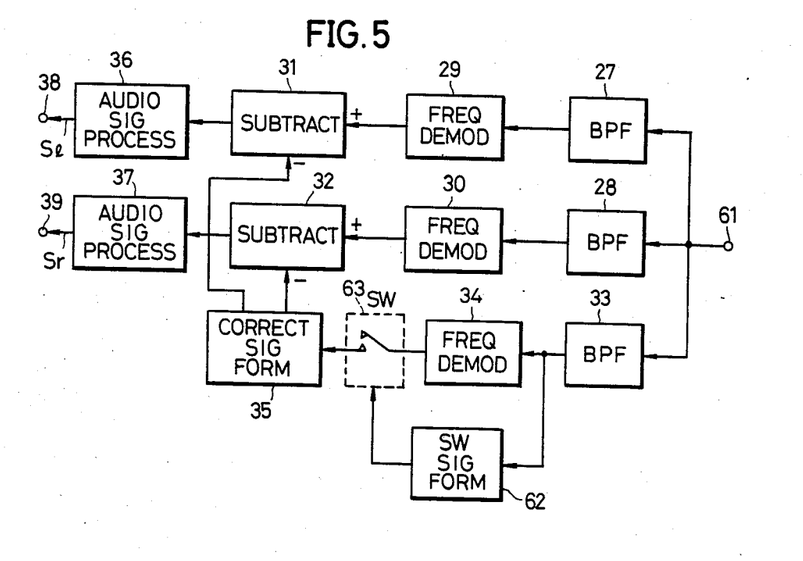
FIG. 5 is a system block diagram showing an essential part of a second embodiment of the rotary head type magnetic recording and reproducing apparatus according to the present invention.

Next, a description will be given with respect to a second embodiment of the rotary head type recording and reproducing apparatus according to the present invention, by referring to FIG. 5. In a case where the magnetic tape which is recorded with the detection signal Sfd as in the case of the embodiment described before is played on the magnetic recording and reproducing apparatus according to the present invention, it is possible to effectively correct and eliminate the frequency drift component as described before. However, a magnetic tape which is recorded on a conventional magnetic recording and reproducing apparatus (that is, a magnetic recording and reproducing apparatus which is not provided with the detection signal generating circuit 19 in the embodiment described before) which has been in existence before the apparatus of the present invention was proposed, is naturally not recorded with the detection signal Sfd described heretofore.

When the magnetic tape which is recorded on such a conventional magnetic recording and reproducing apparatus is played on the magnetic recording and reproducing apparatus according to the present invention, no detection signal Sfd exists at the output of the bandpass filter 33 and a large noise component may be produced. In this case, a demodulated signal of the large noise component may be obtained from the frequency demodulator 34, and an unwanted and false correction signal may be obtained from the frequency drift correction signal forming circuit 35. As a result, the quality of the output signals of the frequency demodulators 29 and 30 may be deteriorated in the subtracting circuits 31 and 32.

The present embodiment contains improvements on the points described above. Fig. 5 shows only the essential part of the present embodiment, and the illustration and description on the remaining parts will be omitted since the remaining parts are the same as the corresponding parts of the first embodiment. The signal obtained from the reproducing amplifier 26 or 26A is applied to an input terminal 61 and is supplied to the bandpass filters 27, 28, and 33. The output signal of the bandpass filter 33 is supplied to the frequency demodulator 34 and a switching signal forming circuit 62. The frequency demodulator 34 is coupled to the frequency drift correction signal forming circuit 35 through a normally-open switch 63. The switching signal forming circuit 62 forms a switching signal from the detection signal Sfd obtained from the bandpass filter 33 when the detection signal Sfd exists. The switch 63 is closed responsive to the switching signal from the switching signal forming circuit 62.

Accordingly, when playing the magnetic tape which is not recorded with the detection signal Sfd, the switch 63 is open, and no signal is obtained from the frequency drift correction signal forming circuit 35. Thus, the output signals of the frequency demodulators 29 and 30 will not be subjected to an unwanted and unnecessary subtraction in the subtracting circuits 31 and 32. On the other hand, when playing the magnetic tape which is recorded with the detection signal Sfd, the switching signal is produced from the switching signal forming circuit 62 and the switch 63 is closed by this switching signal. As a result, the correction and elimination of the frequency drift component is effectively performed in the subtracting circuits 31 and 32, similarly as in the case of the first embodiment described before.

Figure 6:
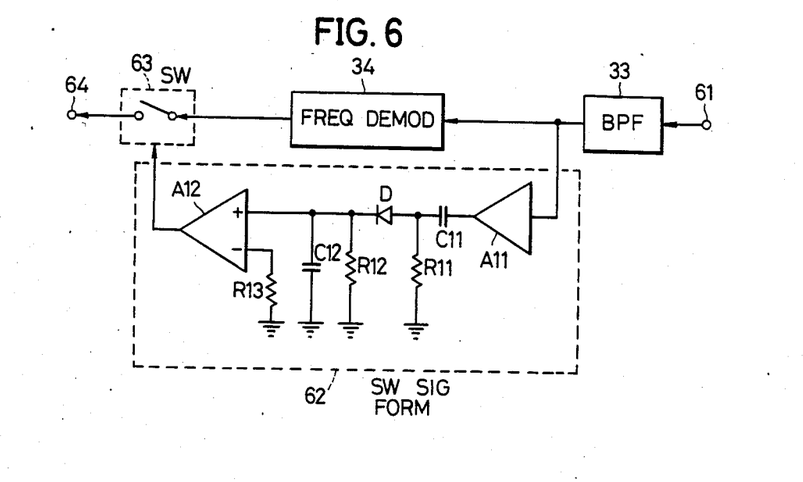
FIG. 6 is a concrete circuit diagram showing a part of the block system shown in FIG. 5.

A concrete circuit example of the switching signal forming circuit 62 is shown in FIG. 6. In FIG. 6, those parts which are the same as those corresponding parts in FIG. 5 are designated by the same reference numerals. The switching signal forming circuit 62 comprises a buffer amplifier A11, capacitors C11 and C12, resistors R11, R12, and R13, a diode D, and an operational amplifier A12 which are coupled as shown in FIG. 6. The diode D, the resistors R11 and R12, and the capacitors C11 and C12 constitute a rectifying and smoothing circuit, and this rectifying and smoothing circuit is coupled to a non-inverting input terminal of the operational amplifier A12. A non-inverting input terminal of the operational amplifier A12 is grounded through the resistor R13. The operational amplifier A12 and the resistors R12 and R13 constitute a comparator.

When the detection signal Sfd having the frequency f3 exists within ths signal supplied to the buffer amplifier A11 from the bandpass filter 33, a rectified voltage is introduced between the two terminals of the resistor R12 within the rectifying and smoothing circuit. The switching signal is introduced at the output of the operational amplifier A12 which constitutes the comparator, responsive to the rectified voltage. The output switching signal of the operational amplifier A12 is supplied to the switch 63 so as to close the switch 63.

Further, the present invention is not limited to these embodiments, but various variations and modifications may be made without departing from the scope of the present invention.

What is claimed is

1. A rotary head type magnetic recording apparatus comprising:
    recording means for recording a recording signal on a magnetic recording medium by rotary heads;
    frequency modulating means for obtaining a frequency modulated audio signal by frequency-modulating a carrier by an audio signal which is to be recorded;
    detection signal generating means for generating a frequency drift detection signal having a constant frequency which does not exist within a frequency range occupied by said frequency modulated audio signal; and
    supplying means for obtaining a frequency multiplexed signal by frequency-multiplexing the frequency modulated audio signal from said frequency modulating means and the frequency drift detection signal from said detection signal generating means and for supplying the frequency multiplexed signal to said recording means as the recording signal.

2. A recording apparatus as claimed in claim 1 in which said frequency modulating means comprises a first frequency modulator for obtaining a first frequency modulated audio signal by frequency-modulating a first carrier having a first frequency by a first channel audio signal which is to be recorded and a second frequency modulator for obtaining a second frequency modulated audio signal by frequency-modulating a second carrier having a second frequency by a second channel audio signal which is to be recorded,
    said detection signal generating means generating a frequency drift detection signal having a frequency which does not exist within frequency ranges occupied by the first and second frequency modulated audio signals from said first and second frequency modulators.

3. A recording apparatus as claimed in claim 1 which further comprises video signal processing means for subjecting a color video signal which is to be recorded to a predetermined signal processing, said color video signal comprising a luminance signal and a carrier chrominance signal, said predetermined signal processing including separation of said luminance signal and said carrier chrominance signal from said color video signal, frequency modulation of a carrier by the separated luminance signal to obtain a frequency modulated luminance signal which occupies a frequency range higher than the frequency range occupied by said frequency modulated audio signal, and frequency conversion of the separated carrier chrominance signal so as to obtain a frequency converted carrier chrominance signal which occupies a frequency range lower than the frequency range occupied by said frequency modulated audio signal, said detection signal generating means generating a frequency drift detection signal having a frequency which exists between the frequency ranges occupied by the frequency modulated luminance signal and the frequency converted carrier chrominance signal from said video signal processing means.

4. A recording apparatus as claimed in claim 1 which further comprises video signal processing means for subjecting a color video signal which is to be recorded to a predetermined signal processing, said color video signal comprising a luminance signal and a carrier chrominance signal, said predetermined signal processing including separation of said luminance signal and said carrier chrominance signal from said color video signal, frequency modulation of a carrier by the separated luminance signal to obtain a frequency modulated luminance signal which occupies a frequency range higher than the frequency range occupied by said frequency modulated audio signal, and frequency conversion of the separated carrier chrominance signal so as to obtain a frequency converted carrier chrominance signal which occupies a frequency range lower than the frequency range occupied by said frequency modulated audio signal, said frequency modulating means comprising a first frequency modulator for obtaining a first frequency modulated audio signal by frequency-modulating a first carrier having a first frequency by a first channel audio signal which is to be recorded and a second frequency modulator for obtaining a second frequency modulated audio signal by frequency-modulating a second carrier having a second frequency by a second channel audio signal which is to be recorded,
    said detection signal generating means generating a frequency drift detection signal having a frequency which exists between frequency ranges occupied by the first frequency modulated audio signal and the frequency converted carrier chrominance signal.

5. A recording apparatus as claimed in claim 4 in which said supplying means comprises adding means for frequency-multiplexing the outputs of said video signal processing means, said first and second frequency modulators, and said detection signal generating means, and means for supplying an output of said adding means to the rotary heads of said recording means.

6. A recording apparatus as claimed in claim 4 in which said rotary heads of said recording means comprises audio rotary heads for recording audio signal and video rotary heads for recording video signal, and said supplying means comprises adding means for frequency-multiplexing the first and second frequency modulated audio signals from said first and second frequency modulators and the frequency drift detection signal from said detection signal generating means, means for supplying an output of said adding means to the audio rotary heads, and means for supplying the output signal of said video signal processing means to the video rotary heads.

7. A rotary head type magnetic recording and reproducing apparatus comprising:
    recording and reproducing means for recording a recording signal on a magnetic recording medium by rotary heads and for reproducing a recorded signal from said magnetic recording medium by the rotary heads;

frequency modulating means for obtaining a frequency modulated audio signal by frequency-modulating a carrier by an audio signal which is to be recorded;

detection signal generating means for generating a frequency drift detection signal having a constant frequency which does not exist within a frequency range occupied by said frequency modulated audio signal;

supplying means for obtaining a frequency multiplexed signal by frequency-multiplexing the frequency modulated audio signal from said frequency modulating means and the frequency drift detection signal from said detection signal generating means and for supplying the frequency multiplexed signal to said recording and reproducing means as the recording signal;

separating means for separating the frequency modulated audio signal and the frequency drift detection signal from the signal reproduced by the rotary heads;

frequency demodulating means for obtaining an audio signal by frequency-demodulating the frequency modulated audio signal separated in said separating means;

detecting means for frequency-demodulating the frequency drift detection signal separated in said separating means and for detecting a frequency drift component;

correction signal forming means for forming a frequency drift correction signal responsive to the output of said detecting means; and correcting means for correcting a frequency drift component in the output audio signal of said frequency demodulating means by the frequency drift correction signal from said correction signal forming means.

8. A recording and reproducing apparatus as claimed in claim 7 in which said correcting means comprises a subtracting circuit for performing a subtraction between the output audio signal of said frequency demodulating means and the output frequency drift correction signal of said correction signal forming means.

9. A recording and reproducing apparatus as claimed in claim 7 in which said frequency modulating means comprises a first frequency modulator for obtaining a first frequency modulated audio signal by frequency-modulating a first carrier having a first frequency by a first channel audio signal which is to be recorded and a second frequency modulator for obtaining a second frequency modulated audio signal by frequency-modulating a second carrier having a second frequency by a second channel audio signal which is to be recorded, said detection signal generating means generates a frequency drift detection signal having a frequency which does not exist within frequency ranges occupied by the first and second frequency modulated audio signals from said first and second frequency modulators, said separating means comprises first, second, and third bandpass filters for separating the first and second frequency modulated audio signals and the frequency drift detection signal from the signal reproduced by the rotary heads, said frequency demodulating means comprises first and second frequency demodulators for frequency-demodulating the first and second frequency modulated audio signals separated in said first and second bandpass filters, respectively, said detecting means comprises a third frequency demodulator for frequency-demodulating the frequency drift detection signal separated in said third bandpass filter, and said correcting means comprises first and second subtracting circuits supplied with the outputs of said first and second frequency demodulators, said first subtracting circuit subtracting the output frequency drift correction signal of said correction signal forming means from the output of said first frequency demodulator, said second subtracting circuit subtracting the output frequency drift correction signal of said correction signal forming means from the output of said second frequency demodulator.

10. A recording and reproducing apparatus as claimed in claim 9 in which said correction signal forming means is supplied with the output of said detecting means and forms a first correction signal which is supplied to said first subtracting circuit and a second correction signal which is supplied to said second subtracting circuit, said second correction signal having a level greater than the level of said first correction signal.

11. A recording and reproducing apparatus as claimed in claim 10 in which said correction signal forming means comprises a first variable resistor for adjusting and setting the level of said first correction signal, and a second variable resistor for adjusting and setting the level of said second correction signal.

12. A recording and reproducing apparatus as claimed in claim 7 which further comprises:

recording video signal processing means for subjecting a color video signal which is to be recorded to a predetermined signal processing, said color video signal comprising a luminance signal and a carrier chrominance signal, said predetermined signal processing including separation of said luminance signal and said carrier chrominance signal from said color video signal, frequency modulation of a carrier by the separated luminance signal to obtain a frequency modulated luminance signal which occupies a frequency range higher than the frequency range occupied by said frequency modulated audio signal, and frequency conversion of the separated carrier chrominance signal so as to obtain a frequency converted carrier chrominance signal which occupies a frequency range lower than the frequency range occupied by said frequency modulated audio signal, said detection signal generating means generating a frequency drift detection signal having a frequency which exists between the frequency ranges occupied by the frequency modulated luminance signal and the frequency converted carrier chrominance signal from said video signal processing means;

another separating means for separating the frequency modulated luminance signal and the frequency converted carrier chrominance signal from the signal reproduced by the rotary heads; and reproduced video signal processing means supplied with the frequency modulated luminance signal and the frequency converted carrier chrominance signal separated in said other separating means for obtaining the original color video signal.

13. A recording and reproducing apparatus as claimed in claim 7 which further comprises:
  recording video signal processing means for subjecting a color video signal which is to be recorded to a predetermined signal processing, said color video signal comprising a luminance signal and a carrier chrominance signal, said predetermined signal processing including separation of said luminance signal and said carrier chrominance signal from said color video signal, frequency modulation of a carrier by the separated luminance signal to obtain a frequency modulated luminance signal which occupies a frequency range higher than the frequency range occupied by said frequency modulated audio signal, and frequency conversion of the separated carrier chrominance signal so as to obtain a frequency converted carrier chrominance signal which occupies a frequency range lower than the frequency range occupied by said frequency modulated audio signal;
  another separating means for separating the frequency modulated luminance signal and the frequency converted carrier chrominance signal from the signal reproduced by the rotary heads; and reproduced video signal processing means supplied with the frequency modulated luminance signal and the frequency converted carrier chrominance signal separated in said other separating means for obtaining the original color video signal,
  said frequency modulating means comprising a first frequency modulator for obtaining a first frequency modulated audio signal by frequency-modulating a first carrier having a first frequency by a first channel audio signal which is to be recorded and a second frequency modulator for obtaining a second frequency modulated audio signal by frequency-modulating a second carrier having a second frequency by a second channel audio signal which is to be recorded,
  said detection signal generating means generating a frequency drift detection signal having a frequency which exists between frequency ranges occupied by the first frequency modulated audio signal and the frequency converted carrier chrominance signal, said separating means comprising first, second, and third bandpass filters for separating the first and second frequency modulated audio signals and the frequency drift detection signal from the signal reproduced by the rotary heads,
  said frequency demodulating means comprising first and second frequency demodulators for frequency-demodulating the first and second frequency modulated audio signals separated in said first and second bandpass filters, respectively,
  said detecting means comprising a third frequency demodulator for frequency-demodulating the frequency drift detection signal separated in said third bandpass filter,
  said correcting means comprising first and second subtracting circuits supplied with the outputs of said first and second frequency demodulators, said first subtracting circuit subtracting the output frequency drift correction signal of said correction signal forming means from the output of said first frequency demodulator, said second subtracting circuit subtracting the output frequency drift correction signal of said correction signal forming means from the output of said second frequency demodulator.

14. A recording and reproducing apparatus as claimed in claim 13 in which said supplying means comprises adding means for frequency-multiplexing the outputs of said video signal processing means, said first and second frequency modulators, and said detection signal generating means, and means for supplying an output of said adding means to the rotary heads of said recording and reproducing means, said signal reproduced by the rotary heads being supplied to said separating means and said other separating means.

15. A recording and reproducing apparatus as claimed in claim 13 in which said rotary heads of said recording and reproducing means comprises audio rotary heads for recording and reproducing audio signal and video rotary heads for recording and reproducing video signal,
  said supplying means comprises adding means for frequency-multiplexing the first and second frequency modulated audio signals from said first and second frequency modulators and the frequency drift detection signal from said detection signal generating means, means for supplying an output of said adding means to the audio rotary heads, and means for supplying the output signal of said recording video signal processing means to the video rotary heads,
  the signal reproduced by said audio rotary heads being supplied to said separating means,
  the signal reproduced by said video rotary heads being supplied to said other separating means.

16. A recording and reproducing apparatus as claimed in claim 9 which further comprises: switching signal forming means supplied with the output signal of said third bandpass filter for forming a switching signal responsive to said frequency drift detection signal; and switching means coupled between said third frequency demodulator and said correction signal forming means, said switching means being open when the switching signal from said switching signal forming means is not applied thereto and being closed when applied with said switching signal.

* * * * *